US009176787B2

(12) United States Patent
Low et al.

(10) Patent No.: US 9,176,787 B2
(45) Date of Patent: Nov. 3, 2015

(54) PRESERVING, FROM RESOURCE MANAGEMENT ADJUSTMENT, PORTIONS OF AN OVERCOMMITTED RESOURCE MANAGED BY A HYPERVISOR

(75) Inventors: Andrew R. Low, Stittsville (CA); Prashanth K. Nageshappa, Karnataka (IN); Saket Saurabh, Nainital (IN); Shivasheesh, Varanasi (IN); Balbir Singh, Gurgaon (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1056 days.

(21) Appl. No.: 13/212,516

(22) Filed: Aug. 18, 2011

(65) Prior Publication Data

US 2013/0047152 A1 Feb. 21, 2013

(51) Int. Cl.
G06F 9/46 (2006.01)
G06F 9/455 (2006.01)
G06F 21/00 (2013.01)
G06F 9/50 (2006.01)

(52) U.S. Cl.
CPC .......... *G06F 9/5077* (2013.01); *G06F 9/45558* (2013.01); *G06F 2209/5014* (2013.01)

(58) Field of Classification Search
None
See application file for complete search history.

(56) References Cited

U.S. PATENT DOCUMENTS

| 7,421,533 | B2* | 9/2008 | Zimmer et al. ................ 711/6 |
| 7,784,053 | B2 | 8/2010 | Casey et al. |
| 7,788,461 | B2* | 8/2010 | Rawson, III ................ 711/170 |
| 8,156,492 | B2* | 4/2012 | Dahlstedt ..................... 718/1 |
| 8,307,362 | B1* | 11/2012 | Gong et al. .................... 718/1 |
| 2005/0235123 | A1* | 10/2005 | Zimmer et al. ............... 711/170 |
| 2009/0198766 | A1* | 8/2009 | Chen et al. .................... 709/202 |
| 2009/0307462 | A1 | 12/2009 | Fleming et al. |
| 2009/0328074 | A1 | 12/2009 | Oshins |
| 2010/0121904 | A1 | 5/2010 | Karo |
| 2010/0241785 | A1 | 9/2010 | Chen et al. |
| 2011/0029969 | A1 | 2/2011 | Venkataraja et al. |
| 2014/0075127 | A1* | 3/2014 | Garthwaite et al. .......... 711/147 |

OTHER PUBLICATIONS

Abel Gordon; Ginkgo: Automated, Application-Driven Memory Overcommitment for Cloud Computing; ASPLOS'11 Workshop and Tutorial program 2011; 6 pages.*
"Performance Tuning Best Practices for ESX Server 3", VMware ESX Server Technical Note, Jan. 2007, pp. 1-22, VMware, Inc., Palo Alto, CA.
Waldspurger, "Memory Resource Management in VMware ESX Server", In Proceedings of the Fifth Symposium on Operating Systems Design and Implementation (OSDI'02), Dec. 2002, pp. 1-14, VMware, Inc., Palo Alto, CA.

(Continued)

*Primary Examiner* — Abdullah Al Kawsar
(74) *Attorney, Agent, or Firm* — Edward J. Lenart; Katherine S. Brown; Kennedy Lenart Spraggins LLP

(57) ABSTRACT

Methods, apparatuses, and computer program products for preserving, from resource management adjustment, portions of an overcommitted resource managed by a hypervisor are provided. Embodiments include identifying, by the hypervisor, a privileged guest from among a plurality of guests of the hypervisor; identifying, by the hypervisor, portions of the overcommitted resource that are allocated to the privileged guest; and preventing, by the hypervisor, resource management adjustment to the identified portions of the overcommitted resource that are allocated to the privileged guest.

8 Claims, 4 Drawing Sheets

(56) References Cited

OTHER PUBLICATIONS

Litke, "Manage Resources on Overcommitted KVM Hosts", IBM Developerworks, Feb. 8, 2011, pp. 1-15, IBM Corporation, USA.
Wells et al., "Hardware Support for Spin Management in Overcommitted Virtual Machines", PACT '06 (Proceedings of the 15th International Conference on Parallel Architectures and Compilation Techniques), Sep. 16-20, 2006, pp. 124-133, ACM Digital Library, Seattle, USA.
Heo et al., "Memory Overbooking and Dynamic Control of Xen Virtual Machines in Consolidated Environments", Integrated Network Management 2009 (IM '09), Jun. 1-5, 2009, pp. 630-637, IFIP/IEEE International Symposium, Long Island, USA.

* cited by examiner

PRESERVING, FROM RESOURCE MANAGEMENT ADJUSTMENT, PORTIONS OF AN OVERCOMMITTED RESOURCE MANAGED BY A HYPERVISOR

BACKGROUND OF THE INVENTION

1. Field of the Invention

The field of the invention is data processing, or, more specifically, methods, apparatuses, and computer program products for preserving, from resource management adjustment, portions of an overcommitted resource managed by a hypervisor.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is the set of software tools referred to as hypervisors. A hypervisor is a layer of system software that runs on the computer hardware beneath an operating system layer to allow multiple operating systems to run, unmodified, on a host computer at the same time by providing each operating system with a set of virtual resources. These virtual resources provide each operating system a portion of the actual resources of the computer. Resources, such as a processor, may be implemented as time slices of the total time the resource is available for use. Other resources, such as memory, may be divided among multiple guest operating systems, where each guest is allocated an instance of memory. Using a hypervisor, the distribution of computer resources within a single computer makes the computer appear to function as if it were two or more independent computers.

To ensure maximum utilization of resources, often hypervisors over-commit a resource to guest operating systems. For example, if a hypervisor creates the illusion that there are more instances (or bandwidth) of a resource than actually physically available, that resource is considered to be over-committed. In an overcommitted resource environment, the hypervisor may balance the demands of the guest operating systems by performing resource management adjustments. In response to a resource management adjustment, the speed and efficiency of a particular guest operating system may be diminished.

SUMMARY OF THE INVENTION

Methods, apparatuses, and computer program products for preserving, from resource management adjustment, portions of an overcommitted resource managed by a hypervisor are provided. Embodiments include identifying, by the hypervisor, a privileged guest from among a plurality of guests of the hypervisor; identifying, by the hypervisor, portions of the overcommitted resource that are allocated to the privileged guest; and preventing, by the hypervisor, resource management adjustment to the identified portions of the overcommitted resource that are allocated to the privileged guest.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for preserving, from resource management adjustment, portions of an overcommitted resource managed by a hypervisor in accordance with the present invention are described with reference to the accompanying drawings, beginning with FIG. 1. Preserving, from resource management adjustment, portions of an overcommitted resource managed by a hypervisor in accordance with the present invention is generally implemented with computers, that is, with automated computing machinery.

Figure 1:
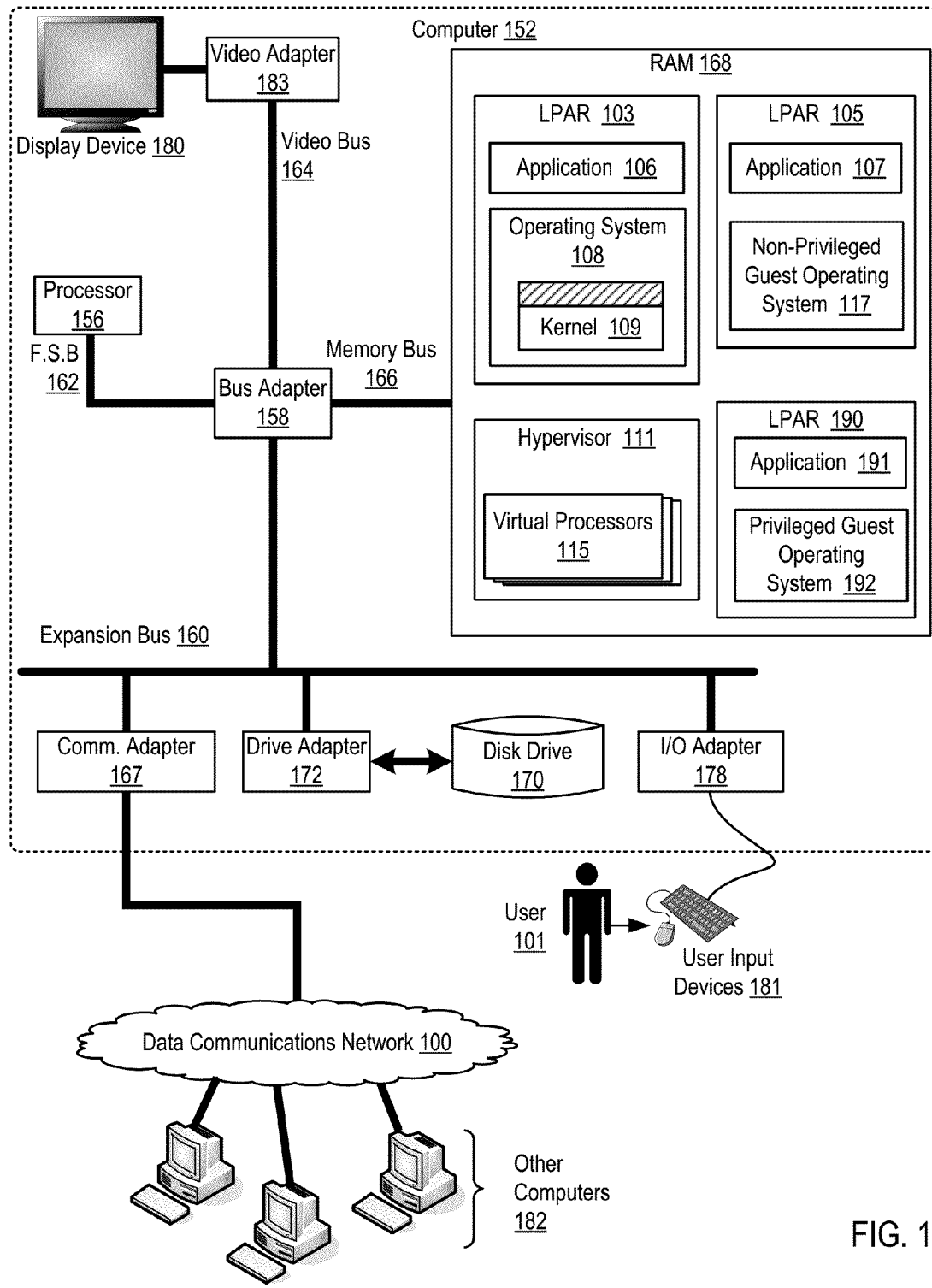
FIG. 1 sets forth a diagram of automated computing machinery comprising an exemplary computer useful in preserving, from resource management adjustment, portions of an overcommitted resource managed by a hypervisor according to embodiments of the present invention.

FIG. 1 sets forth a block diagram of automated computing machinery comprising an exemplary computer (152) useful in preserving, from resource management adjustment, portions of an overcommitted resource managed by a hypervisor according to embodiments of the present invention. The computer (152) of FIG. 1 includes at least one computer processor (156) or 'CPU' as well as random access memory (168) ('RAM') which is connected through a high speed memory bus (166) and bus adapter (158) to the processor (156) and to other components of the computer (152).

Stored in RAM (168) is a hypervisor (111), an operating system (108), a non-privileged guest operating system (117), and a privileged guest operating system (192), and applications (106, 107, 191). The hypervisor (111) stored in RAM (168) is a layer of system software that runs on the computer hardware beneath an operating system layer to allows multiple operating systems to run, unmodified, on a host computer at the same time. The hypervisor (111) provides each operating system with a set of virtual resources by allocating these resources to each operating system using logical partitions. A logical partition ('LPAR')—sometimes referred to as a 'virtual machine'—is a set of data structures and services that enables distribution of computer resources within a single computer to make the computer function as if it were two or more independent computers.

In order to allow multiple operating systems to run at the same time, the hypervisor (111) assigns virtual processors (115) to each operating system (108, 117, 192) and schedules virtual processors (115) on the physical processors of the computer (152). A virtual processor is a subsystem that implements assignment of processor time to a logical partition. In the example of FIG. 1, one processor (156) is illustrated, however, according to embodiments of the present invention, a shared pool of physical processors may support the assignment of partial physical processors (in time slices) to a logical partition. Such partial physical processors shared in time slices are referred to as 'virtual processors.' A thread of execution is said to run on a virtual processor when it is running on the virtual processor's time slice. Sub-processor partitions time-share a physical processor among a set of virtual processors, in a manner that is invisible to an operating system running in a logical partition. Unlike multiprogramming within the operating system where a thread can remain in control of the physical processor by running in interrupt-disabled mode, in sub-processor partitions, the thread is still pre-empted by the hypervisor at the end of its virtual processor's time slice, in order to make the physical processor available to a different virtual processor.

In the example of FIG. 1, the hypervisor (111) allocates virtual resources to a logical partition (103) that provides an execution environment for application (106) and operating system (108). The hypervisor (111) also allocates virtual resources to a logical partition (105) that provides an execution environment for application (107) and non-privileged guest operating system (117). In addition, the hypervisor (111) also allocates virtual resources to a logical partition (190) that provides an execution environment for application (191) and privileged guest operating system (192). Each application (106, 107, 191) is a set of computer program instructions implementing user-level data processing. Each application (106, 107, 191) may be a stand-alone application in which all the computer program instructions of each application (106, 107, 191) are executed on a single compute node, or each application (106, 107, 191) may be a distributed application in which portions of the computer program instructions are executed serially or in parallel with other portions of the computer program instructions being executed on other compute nodes.

A guest operating system is an operating system that is limited to the resources and abstractions provided by a hypervisor. In this specification, a guest operating system is considered 'privileged' in that it is specially designated due to the nature of its execution applications or its function. That is, a privileged guest operating system may be so designated because it is responsible for executing time critical applications. In the example of FIG. 1, the non-privileged guest operating system (117) controls the execution of the application (107) on the computer (152) and the privileged guest operating system (192) controls execution of application (191) on the computer (152). The non-privileged guest operating system (117) of FIG. 1 is system software that manages the virtual resources allocated to the logical partition (105) by the hypervisor (111) and the privileged guest operating system (192) is system software that manages the virtual resources allocated to the logical partition (190) by the hypervisor (111). The non-privileged guest operating system (117) and the privileged guest operating system (192) perform basic tasks such as, for example, controlling and allocating virtual memory, prioritizing the processing of instructions, controlling virtualized input and output devices, facilitating networking, and managing a virtualized file system.

Similarly, the operating system (108) of FIG. 1 controls the execution of the application (106) on the computer (152). The application (106) of FIG. 1 accesses resources provided by the operating system (108) through the kernel (109). The kernel (109) is the core component of the operating system (108) that manages the system's resources and the communication between applications and virtual resources provided by the hypervisor (111). The kernel (109) provides software applications with abstraction layers of the virtual hardware resources that allow the applications to utilize these virtual hardware resources. The kernel (109) makes these abstraction layers available to user-level applications through inter-process communication mechanisms.

The hypervisor (111) is configured for preserving, from resource management adjustment, portions of an overcommitted resource managed by a hypervisor according to embodiments of the present invention. Specifically, the hypervisor (111) includes computer program instructions that when executed by the processor (156), cause the computer (152) to carry out the steps of: identifying, by the hypervisor (111), a privileged guest (192) from among a plurality of guests (192, 117) of the hypervisor (111); identifying, by the hypervisor (111), portions of the overcommitted resource that are allocated to the privileged guest (192); and preventing, by the hypervisor (111), resource management adjustment to the identified portions of the overcommitted resource that are allocated to the privileged guest (192).

The applications (106, 107, 191), the operating systems (108, 117, 192), the kernel (109), and the hypervisor (111) illustrated in FIG. 1 are software components, that is computer program instructions. Operating systems that may be improved for providing policy-based operating system services in a hypervisor on a computing system in accordance with the present invention may include UNIX™, Linux™, Microsoft NT™, IBM's AIX™, IBM's i5/OS™, and others as will occur to those of skill in the art. The operating systems (108, 117, 192), the applications (106, 107, 191), the logical partitions (103, 105, 190), and the hypervisor (111) in the example of FIG. 1 are shown in RAM (168), but many components of such software typically are stored in non-volatile memory also, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for preserving, from resource management adjustment, portions of an overcommitted resource managed by a hypervisor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as input from a user (101) on user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preserving, from resource management adjustment, portions of an overcommitted resource managed by a hypervisor according to embodiments of the present invention include modems for wired dial-up communications, Ethernet (IEEE 802.3) adapters for wired data communications network communications, and 802.11 adapters for wireless data communications network communications.

Figure 2:
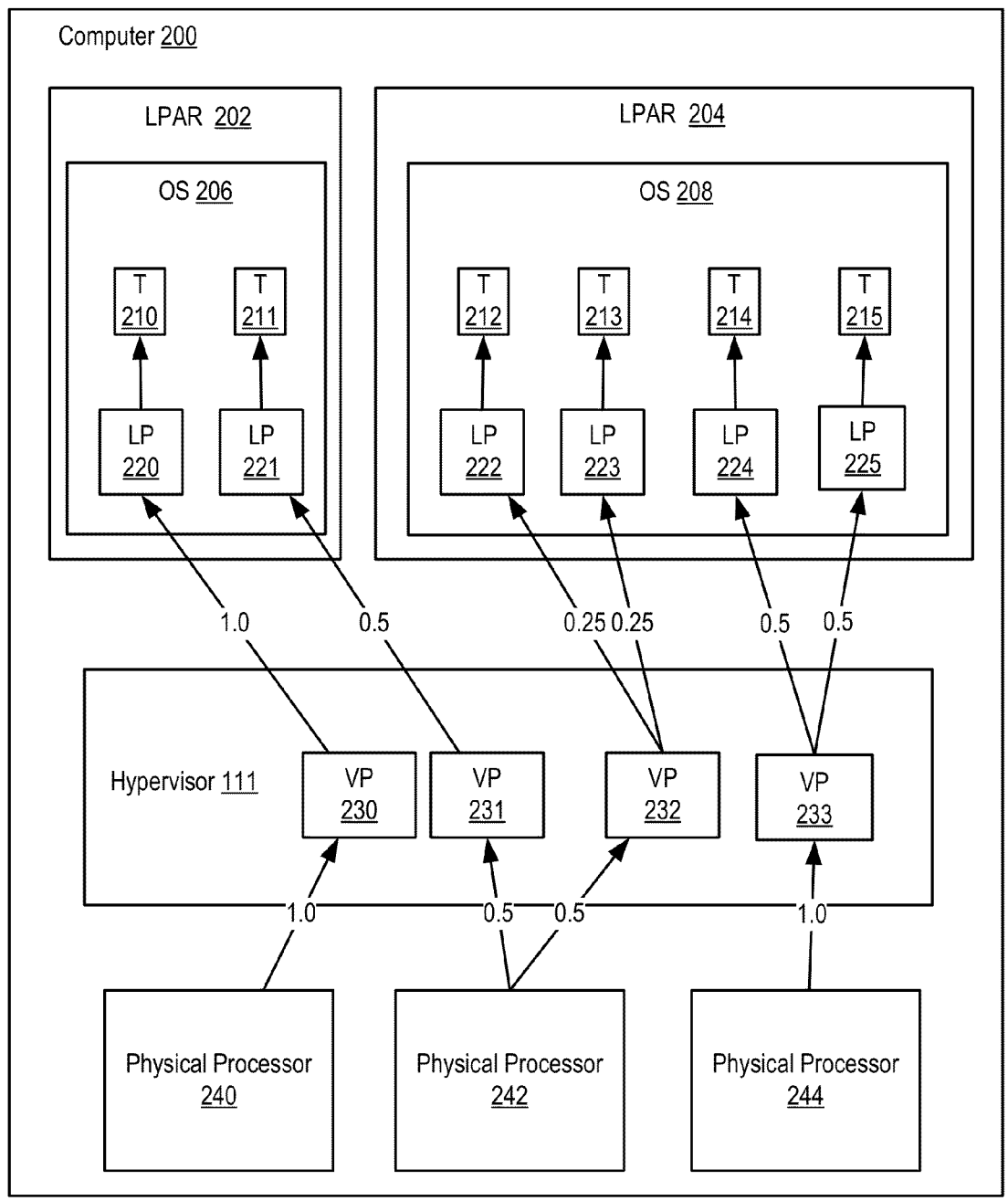
FIG. 2 sets forth a diagram illustrating an exemplary computer configured with a hypervisor useful in preserving, from resource management adjustment, portions of an overcommitted resource managed by a hypervisor according to embodiments of the present invention.

For further explanation of allocating virtual processors to logical partitions by the hypervisor, FIG. 2 sets forth a diagram illustrating an exemplary computer configured with a hypervisor useful in preserving, from resource management adjustment, portions of an overcommitted resource managed by a hypervisor according to embodiments of the present invention.

The system of FIG. 2 includes logical partition (LPAR) (202) and LPAR (204). The system of FIG. 2 includes two operating systems (206, 208), one each in LPAR (202) and LPAR (204) respectively. The system of FIG. 2 includes six logical processors (220-225), two for operating system (206) in LPAR (202) and four for operating system (208) in LPAR (204). A logical processor is an operating system's structure for scheduling threads for execution. It represents a portion of the resources of a processor that is capable of carrying out the execution of a thread. Six threads (210-215) run on the six logical processors (220-225) respectively, one thread per logical processor. The system of FIG. 2 includes a hypervisor (111) and four virtual processors, two virtual processors (230, 231) assigned to LPAR (202) and two virtual processors (232, 233) assigned to LPAR (204).

The system of FIG. 2 also includes three physical processors (240, 242, 244). In the examples in this specification, the physical processors (240, 242, 244) are shared according to processing units with 1.0 processing units representing the processing capacity of one physical processor. In this example, the processing capacity of the three physical processors (240, 242, 244) is apportioned to the LPARs as follows:

All of the processing capacity of physical processor (240) is assigned entirely to virtual processor (230), so that logical processor (220) has available to it the entirety of physical processor (240).

One-half the processing capacity of physical processor (242) is assigned to virtual processor (231), so that logical processor (221) has available to it in time slices one-half of physical processor (242).

One-half the processing capacity of physical processor (242) is assigned to virtual processor (232). Virtual processor (232) is assigned to LPAR (204) which runs in simultaneous multithreading mode with two logical processors (222, 223) for virtual processor (232). Logical processor (222) and logical processor (223) each has available to it in time slices one-fourth of the processing capacity of physical processor (242).

All of the processing capacity of physical processor (244) is assigned to virtual processor (233). Virtual processor (233) is assigned to LPAR (204) which runs in simultaneous multithreading mode with two logical processors (224, 225) for virtual processor (233). Logical processor (224) and logical processor (225) each has available to it in time slices one-half of the processing capacity of physical processor (244).

The number, arrangement, and assignments of physical processors, virtual processors, and logical processors in the system of FIG. 2 are for explanation only, and not for a limitation of the present invention. A computer useful for preserving, from resource management adjustment, portions of an overcommitted resource managed by a hypervisor according to embodiments of the present invention may support a multiplicity of logical partitions and may include any number, arrangement, or assignment of physical processors, virtual processors, and logical processors.

Figure 3:
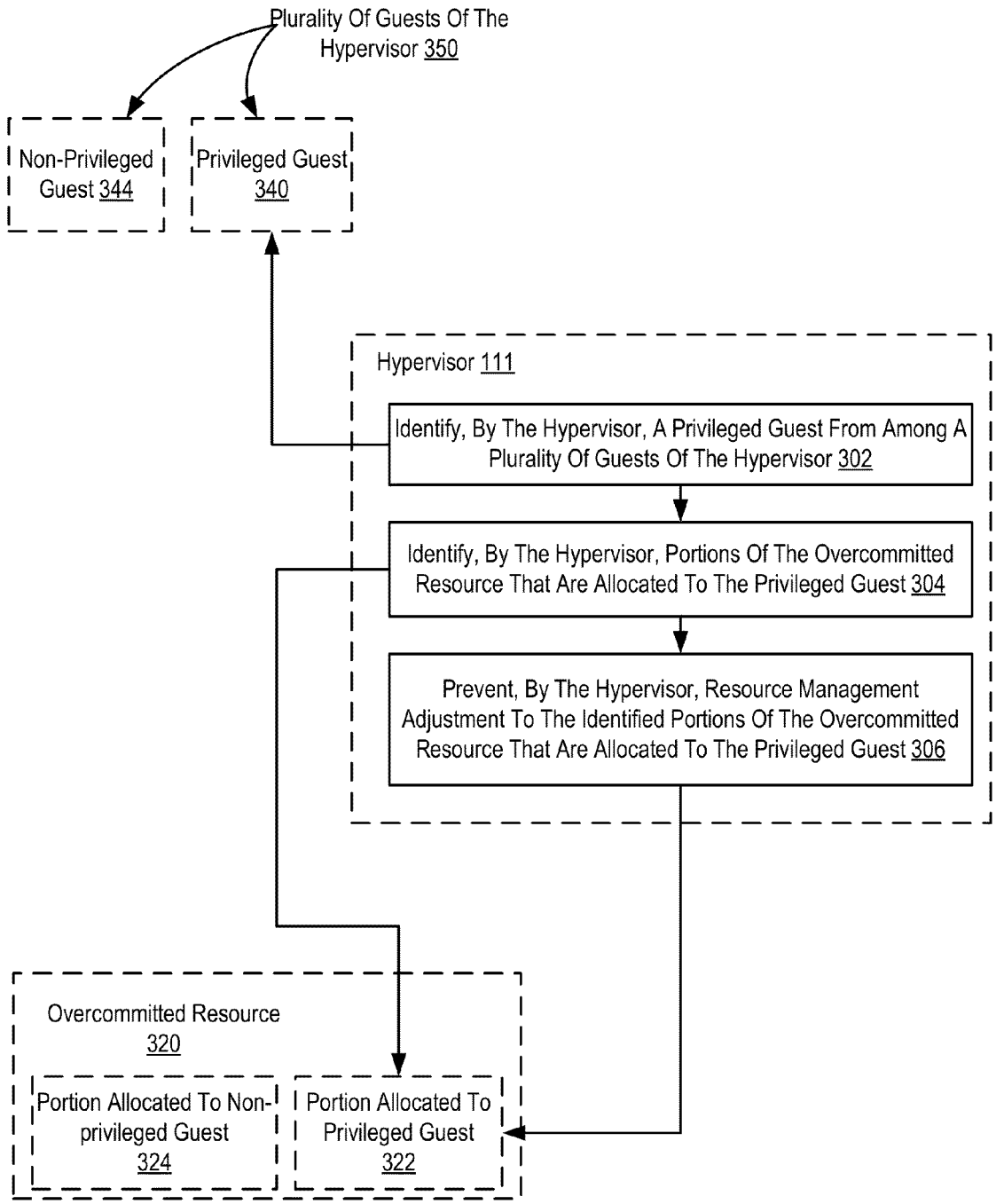
FIG. 3 sets forth a flow chart illustrating an exemplary method for preserving, from resource management adjustment, portions of an overcommitted resource managed by a hypervisor according to embodiments of the present invention.

For further explanation, FIG. 3 sets forth a flow chart illustrating an exemplary method for preserving, from resource management adjustment, portions of an overcommitted resource managed by a hypervisor according to embodiments of the present invention. The method of FIG. 3 includes identifying (302), by the hypervisor (111), a privileged guest (340) from among a plurality (350) of guests of the hypervisor (111). Identifying (302) a privileged guest (340) from among a plurality (350) of guests of the hypervisor (111) may be carried out by examining the priorities of the guest operating systems; determining which guest operating systems are executing time sensitive or critical applications; determining which guest operating systems most require predictable performance; or a guest operating system is identified as a privileged guest operating system by the user or system administrator.

The method of FIG. 3 includes identifying (304), by the hypervisor (111), portions (322) of the overcommitted resource (320) that are allocated to the privileged guest (340). An overcommitted resource may be any resource of the computer that is divided into assigned portions greater than the whole of all of the portions of the resource. Resources may include memory, processors, and input/output (I/O) devices. Examples of over-committing resources include assigning the same section of memory to multiple guest operating systems. Identifying (304) portions (322) of the overcommitted resource (320) that are allocated to the privileged guest (340) may be carried out by tracking within the hypervisor (111) assignments of the portions of the overcommitted resource (320) to the different guest operating systems. For example, the non-privileged guest operating system (344) may be allocated a first portion (324) of the overcommitted resource (320) and a privileged guest (340) may be allocated a second portion (322) of the overcommitted resource (320).

The method of FIG. 3 includes preventing (306), by the hypervisor (111), resource management adjustment to the identified portions (322) of the overcommitted resource (320) that are allocated to the privileged guest (340). A resource management adjustment is an action taken by a hypervisor in response to over utilization of an overcommitted resource. For example, if memory is overcommitted (i.e., the same portions of memory are assigned to multiple guest operating systems) and the multiple guest operating systems begin to approach full utilization of their allocated portions of memory, the hypervisor (111) may need to reduce the amount of memory that is assigned to each guest operating system. Preventing (306) resource management adjustment to the identified portions (322) of the overcommitted resource (320) that are allocated to the privileged guest (340) may be carried out by performing the resource management adjustment on one or more of the guest operating systems that are not identified as a privileged guest operating system.

Figure 4:
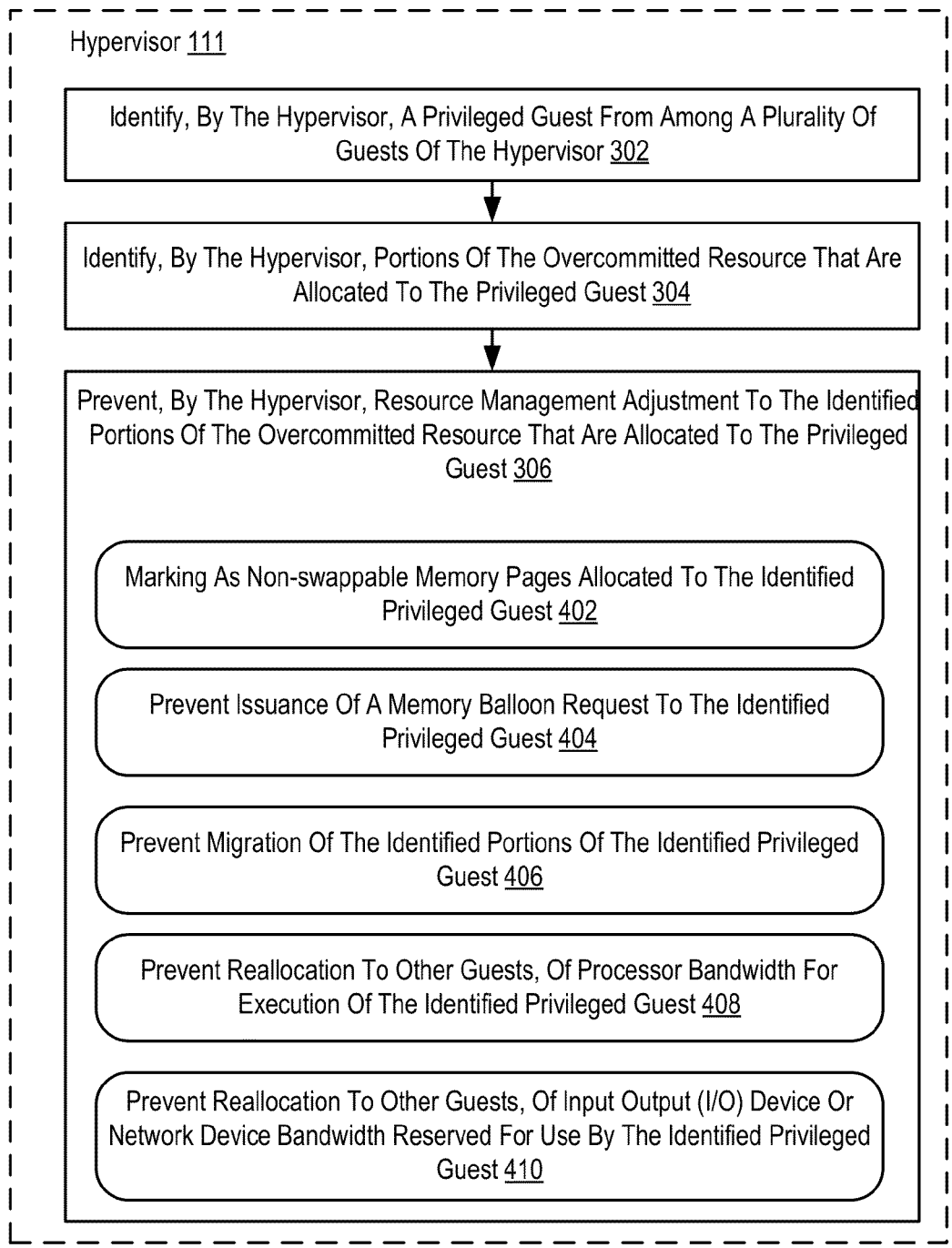
FIG. 4 sets forth a flow chart illustrating a further exemplary method for preserving, from resource management adjustment, portions of an overcommitted resource managed by a hypervisor according to embodiments of the present invention.

For further explanation, FIG. 4 sets forth a flow chart illustrating a further exemplary method for preserving, from resource management adjustment, portions of an overcommitted resource managed by a hypervisor according to embodiments of the present invention. The method of FIG. 4 is similar to the method of FIG. 3 in that the method of FIG. 4 also includes: identifying (302), by the hypervisor (111), a privileged guest (340) from among a plurality (350) of guests of the hypervisor (111); identifying (304), by the hypervisor (111), portions (322) of the overcommitted resource (320) that are allocated to the privileged guest (340); and preventing (306), by the hypervisor (111), resource management adjustment to the identified portions (322) of the overcommitted resource (320) that are allocated to the privileged guest (340).

In the method of FIG. 4, preventing (306) resource management adjustment to the identified portions (322) of the overcommitted resource (320) that are allocated to the privileged guest (340) optionally includes marking (402) as non-swappable, by the hypervisor (111), memory pages allocated to the identified privileged guest (340). The resource management adjustment of swapping memory includes taking pages from within memory and storing the pages in a secondary storage, thus freeing up space with memory. Marking (402) as non-swappable memory pages allocated to the identified privileged guest (340) may be carried out by tracking the pages that correspond to the privileged guest (340) and only allowing swapping out pages that are not associated with the privileged guest (340).

Normally, when the hypervisor wants to reclaim memory, it transmits a balloon request to a balloon driver within a guest operating system. The balloon driver responds by allocating pinned physical pages within the guest operating system using appropriate native interfaces.

Inflating the balloon increases memory pressure in the guest operating system, causing it to invoke its own native memory management algorithms. When memory is plentiful, the guest operating system will return memory from its free list. When memory within the guest operating system is scarce, it must reclaim space to satisfy the driver allocation request. The guest operating system decides which particular pages to reclaim and, if necessary, pages them out to its own virtual disk. The balloon driver communicates the physical page number for each allocated page to the hypervisor, which may then reclaim the corresponding machine page. Deflating the balloon frees up memory for general use within the guest operating system.

In the method of FIG. 4, preventing (306) resource management adjustment to the identified portions (322) of the overcommitted resource (320) that are allocated to the privileged guest (340) optionally includes preventing (404), by the hypervisor (111), issuance of a memory balloon request to the identified privileged guest (340). Preventing (404), by the hypervisor (111), issuance of a memory balloon request to the identified privileged guest (340) may be carried out by transmitting memory balloon inflation requests to other guest operating systems that are not identified as a "privileged guest operating system."

In the method of FIG. 4, preventing (306) resource management adjustment to the identified portions (322) of the overcommitted resource (320) that are allocated to the privileged guest (340) optionally includes preventing (406), by the hypervisor (111), migration of the identified privileged guest. The resource management adjustment by migrating guest include, reallocating a one guest operating system from one physical machine to another physical machine. Preventing (406), by the hypervisor (111), migration of the identified privileged guest may be carried out by tracking the privileged guest and preventing reallocation of the same at the start of the migration process.

In the method of FIG. 4, preventing (306) resource management adjustment to the identified portions (322) of the overcommitted resource (320) that are allocated to the privileged guest (340) optionally includes preventing (408), by the hypervisor (111), reallocation to other guests, of processor bandwidth reserved for execution of the identified privileged guest (340). Preventing (408), by the hypervisor (111), reallocation to other guests, of processor bandwidth reserved for execution of the identified privileged guest (340) may be carried out by tracking the processor bandwidth that is assigned to privileged guest operating systems and preventing reallocation of that bandwidth to other guest operating systems.

In the method of FIG. 4, preventing (306) resource management adjustment to the identified portions (322) of the overcommitted resource (320) that are allocated to the privileged guest (340) optionally includes preventing (410), by the hypervisor (111), reallocation to other guests, of input/output (I/O) or network device bandwidth reserved for use by the identified privileged guest (340). Preventing (410), by the hypervisor (111), reallocation to other guests, of input/output (I/O) or network device bandwidth reserved for use by the identified privileged guest (340) may be carried out by tracking the I/O or network device bandwidth that is assigned to privileged guest operating systems and preventing reallocation of that bandwidth to other guest operating systems.

Exemplary embodiments of the present invention are described largely in the context of a fully functional computer system for preserving, from resource management adjustment, portions of an overcommitted resource managed by a hypervisor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising:
   a computer processor and a computer memory coupled to the computer processor, the computer memory having disposed within it computer program instructions that when executed by the computer processor cause the apparatus to carry out the steps of:
   identifying, by a hypervisor, a guest as a privileged guest from among a plurality of non-privileged guests of the hypervisor based on a time-critical application being executed by the privileged guest;
   identifying, by the hypervisor, portions of an overcommitted resource that are allocated to the privileged guest, wherein the overcommitted resource comprises at least an assignment of one or more same portions of a resource to the privileged guest and at least another non-privileged guest of a computing device;
   preventing, by the hypervisor, resource management adjustment to the identified portions of the overcommitted resource that are allocated to the privileged guest, wherein the resource management adjustment comprises an action taken by the hypervisor in response to over utilization of the overcommitted resource and wherein the action includes at least marking as non-swappable memory pages allocated to the identified privileged guest by tracking the memory pages that correspond to the privileged guest and allowing swapping of only one or more memory pages that are not associated with the privileged guest; and wherein preventing resource management adjustment to the identified portions of the overcommitted resource that are allocated to the privileged guest further includes preventing, by the hypervisor, issuance of a memory balloon request to the identified privileged guest.

2. The apparatus of claim 1 wherein preventing resource management adjustment to the identified portions of the overcommitted resource that are allocated to the privileged guest includes preventing, by the hypervisor, migration of the identified privileged guest.

3. The apparatus of claim 1 wherein preventing resource management adjustment to the identified portions of the overcommitted resource that are allocated to the privileged guest includes preventing, by the hypervisor, reallocation to other guests, of processor bandwidth reserved for execution of the identified privileged guest.

4. The apparatus of claim 1 wherein preventing resource management adjustment to the identified portions of the overcommitted resource that are allocated to the privileged guest includes preventing, by the hypervisor, reallocation to other guests, of input/output (I/O) or network device bandwidth reserved for use by the identified privileged guest.

5. A computer program product including a computer readable storage medium, wherein the computer readable storage medium is not a signal, the computer readable storage medium comprising computer program instructions that when executed by a computer cause the computer to carry out the steps of:

identifying, by the hypervisor, a guest as a privileged guest from among a plurality of non-privileged guests of the hypervisor based on a time-critical application being executed by the privileged guest;

identifying, by the hypervisor, portions of an overcommitted resource that are allocated to the privileged guest, wherein the overcommitted resource comprises at least an assignment of one or more same portions of a resource to the privileged guest and at least another non-privileged guest of a computing device;

preventing, by the hypervisor, resource management adjustment to the identified portions of the overcommitted resource that are allocated to the privileged guest, wherein the resource management adjustment comprises an action taken by the hypervisor in response to over utilization of the overcommitted resource and wherein the action includes at least marking as non-swappable memory pages allocated to the identified privileged guest by tracking the memory pages that correspond to the privileged guest and allowing swapping of only one or more memory pages that are not associated with the privileged guest; and wherein preventing resource management adjustment to the identified portions of the overcommitted resource that are allocated to the privileged guest further includes preventing, by the hypervisor, issuance of a memory balloon request to the identified privileged guest.

6. The computer program product of claim 5 wherein preventing resource management adjustment to the identified portions of the overcommitted resource that are allocated to the privileged guest includes preventing, by the hypervisor, migration of the identified privileged guest.

7. The computer program product of claim 5 wherein preventing resource management adjustment to the identified portions of the overcommitted resource that are allocated to the privileged guest includes preventing, by the hypervisor, reallocation to other guests, of processor bandwidth reserved for execution of the identified privileged guest.

8. The computer program product of claim 5 wherein preventing resource management adjustment to the identified portions of the overcommitted resource that are allocated to the privileged guest includes preventing, by the hypervisor, reallocation to other guests, of input/output (I/O) or network device bandwidth reserved for use by the identified privileged guest.

* * * * *